United States Patent [19]

Maiefski

[11] Patent Number: 5,318,147
[45] Date of Patent: Jun. 7, 1994

[54] ANTI-CARJACKING SYSTEM

[76] Inventor: Romaine R. Maiefski, 1312 Hollins Rd., Oceanside, Calif. 92056

[21] Appl. No.: 992,600

[22] Filed: Dec. 18, 1992

[51] Int. Cl.⁵ .............................................. B60R 21/12
[52] U.S. Cl. ................................. 180/287; 180/271; 109/32
[58] Field of Search ............................ 180/271, 287; 239/284.1, 289; 109/32; 137/351

[56] References Cited

U.S. PATENT DOCUMENTS

| | | | |
|---|---|---|---|
| 772,494 | 3/1903 | Copp | 109/32 |
| 776,599 | 12/1904 | Kitchener | 109/32 |
| 2,009,026 | 7/1935 | Searle | 180/271 |
| 4,611,761 | 9/1986 | Pollard | 239/284.1 |
| 5,141,160 | 8/1992 | Waters | 239/284.1 |

FOREIGN PATENT DOCUMENTS

| | | | |
|---|---|---|---|
| 2743328 | 3/1978 | Fed. Rep. of Germany | 180/271 |
| 2540655 | 8/1984 | France | 180/271 |

*Primary Examiner*—Margaret A. Focarino
*Assistant Examiner*—Peter English
*Attorney, Agent, or Firm*—Baker, Maxham, Jester & Meador

[57] ABSTRACT

An apparatus for protecting an auto from hijacking, comprises a nozzle for mounting in a position adjacent a driver's door for directing a spray of a disabling substance into an area at about face level at the driver's door, a source of pressurized disabling fluid, a conduit for connecting the source of fluid to the nozzle for delivering a selected quantity of the fluid to the nozzle, and a remote control switch operative from the driver's seat of the auto for initiating the dispensing of a quantity of the fluid via the nozzle.

16 Claims, 1 Drawing Sheet

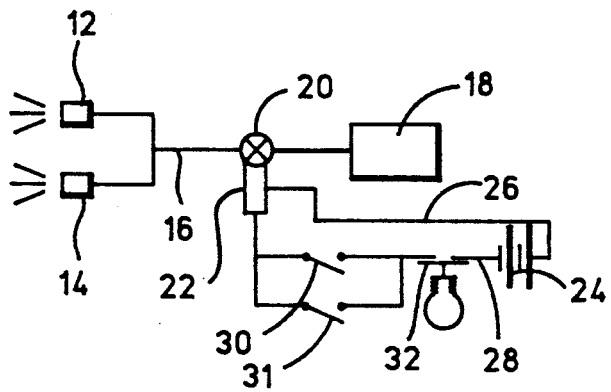
FIG. 1
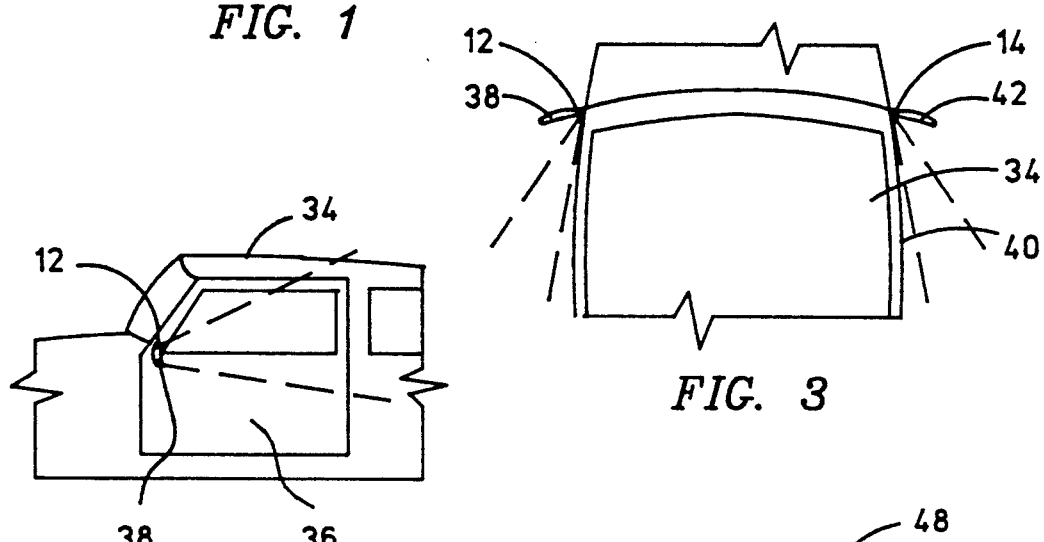
FIG. 2
FIG. 3
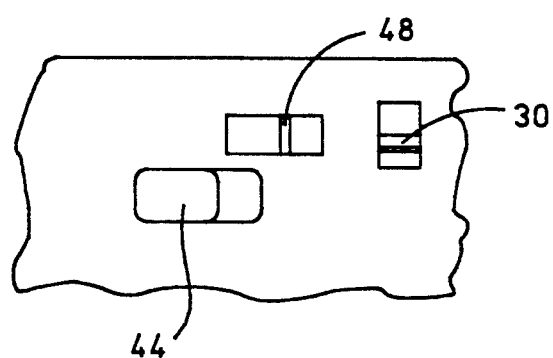
FIG. 4
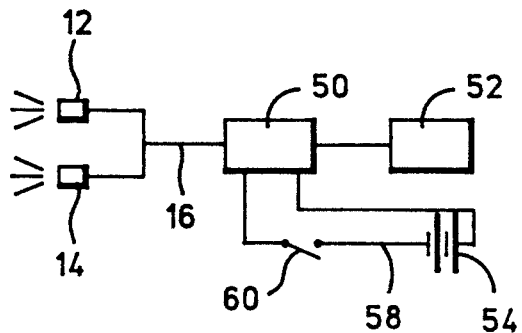
FIG. 5
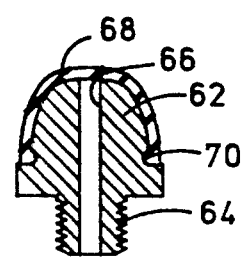
FIG. 6

ANTI-CARJACKING SYSTEM

BACKGROUND OF THE INVENTION

The present invention relates to defensive systems and pertains particularly to an improved system for defense against auto hijacking.

There has been a recent rash of auto thefts wherein the auto is taken from the possession of the driver with a gun or other weapon. These thefts or hijackings, currently termed carjacking, usually take place at street intersections and in parking lots, usually at gunpoint. This provides the thief with a readily operable vehicle without having to break into the car and hot-wire it. However, it subjects the driver to a high risk of violence which may result in injury or even death.

Many citizens, in order to protect themselves, are arming themselves with weapons, such as knives and guns. However, this has a tendency to increase the risk of violence and injury to the victim.

It is desirable that an effective and reasonably safe means for defense against carjacking be available.

SUMMARY AND OBJECTS OF THE INVENTION

It is the primary object of the present invention to provide an improved and effective and reasonably safe means for defense against carjacking.

In accordance with a primary aspect of the present invention, an apparatus for protecting an auto from hijacking comprises nozzle means for mounting in a position adjacent a driver's door for directing a spray of a disabling substance into an area at about face level at the driver's door, a source of pressurized disabling fluid, conduit means for connecting said source of fluid to said nozzle means for delivering a selected quantity of said fluid thereto, and remote control means operative from the driver's seat of the auto for initiating the dispensing of a quantity of said fluid via said nozzle.

BRIEF DESCRIPTION OF THE DRAWINGS

The above and other objects and advantages of the present invention will become apparent from the following description when read in conjunction with the accompanying drawings wherein:

FIG. 1 is a schematic illustration of a preferred embodiment of the invention;

FIG. 2 is a side elevation view of a portion of an auto showing an exemplary installation;

FIG. 3 is a top plan view of the embodiment of FIG. 2;

FIG. 4 is an enlarged view showing a typical installation of a control switch;

FIG. 5 is a view like FIG. 1 of an alternative embodiment of the invention; and

FIG. 6 is a side elevation view in section of a nozzle having a protective cover.

DETAILED DESCRIPTION OF A PREFERRED EMBODIMENT

Referring to FIG. 1 of the drawings, there is schematically illustrated an apparatus designated generally by the numeral for protecting an auto from carjacking in accordance with a preferred embodiment of the invention. The apparatus in an exemplary embodiment comprises spray nozzle means, preferably in the form of first and second nozzles 12 and 14 connected by way of conduit means, including a main conduit 16 to a source of pressurized disabling fluid 18.

The nozzles 12 and 14 are adapted to be mounted in an area around the door, preferably the driver's door and passenger's door of an automobile and positioned to spray a gas, fog or mist into a zone of entry or access to the automobile. This zone of entry or access into the automobile, in a typical example, will be primarily the driver's door and secondarily the front passenger's door. The preferred area of the zone of the spray will be an upper part of this entry or access zone from about the bottom of the window to above the top of the car. More specifically, the entry zone is an area designed to get the spray into the face of an attacker.

The spray for the apparatus comprises a suitable source of an incapacitating or disabling gas, such as tear gas or other gases or spray used for defensive purposes, such as pepper gas and substances available under the trademark Mace. In a preferred embodiment, the disabling gas is preferably contained in a pressurized canister 18 and pressurized with a suitable propellant gas, such as nitrogen or other suitable gas. A solenoid operated valve 20 is contained in the supply line 16 and includes an electrically operated solenoid 22 for operating the valve 20. The fluid may also be in a non-pressurized container and propelled such as by siphon by a pressurized gas.

The apparatus includes control means in the form of an electrical circuit for remotely activating the solenoid valve. The control circuit includes a battery 24 connected by conductors 26 and 28 to the solenoid 22. An actuating switch 30 is contained in the conductor 28 of the circuit to activate and deactivate the circuit and the apparatus. The major components of the apparatus are preferably mounted in the engine compartment and the appropriate fluid and electrical lines run to the nozzles and activating switch. The activating switch 30 is preferably mounted in position for the driver, but an additional switch 31 may be provided for the passenger.

The control means or circuit may also preferably include a lock-out switch 32 which may be operated by either a key or a lock combination to deactivate the system when the automobile is in home storage, such as a garage or the like. This inactivates the system where children may play and accidentally activate the system. The system preferably is not connected through the ignition system of the automobile. This is so that the driver need not get in the automobile and insert the keys into the ignition switch in order to activate the system. Many carjackings occur as the driver is entering or has just entered the automobile in a parking lot. It is desirable that the operator of the automobile may be able to activate the system without the necessity of turning on the ignition system.

Referring to FIGS. 2 and 3, one or more nozzles may be mounted around the driver's door and around the passenger's door. For the sake of simplicity, as illustrated in FIGS. 2 and 3, a single nozzle may be conveniently mounted on or adjacent the rear view mirror to cover the area or zone from the windows of the driver and passenger upward to and above the top of the automobile and outward therefrom. Specific details of mounting of the nozzle is omitted since any conventional means may be used. For example, a mounting clamp may be used to clamp to the mirror support and carry the nozzle. The nozzle may also be mounted in holes or openings in the door itself. It may also be mounted on the rain gutter of the car body above and or around the windows.

Referring to FIGS. 2 and 3, a portion of an automobile body 34 is illustrated showing that portion of the body encompassing the driver and front passenger compartment. The automobile body has the usual driver's side door 36 which opens along a hinge at the forward edge to enable the driver to enter and exit the automobile. A driver's side rear view mirror 38 is normally attached to the front portion of the driver's door.

Referring to FIG. 3, a top view of the car body portion of FIG. 2 is illustrated also showing the arrangement for the front passenger's door side of the car. This is substantially a mirror image of the driver's side, with a passenger's door 40 and a passenger's side rear view mirror 42. In this arrangement, the passenger side nozzle 14 is mounted preferably at or about the rear view mirror. The nozzles preferably fill the upper portion of the area adjacent the doors with a spray or mist of disabling fluid that the attacker must pass through to get to the driver or passenger.

The apparatus is preferably arranged to be operated by the driver or operator of the automobile. For this reason, the control switch 30 is preferably mounted for easy access by one in the driver's compartment or station of the automobile. Referring to FIG. 4, a typical arrangement of some door latch and locking operator mechanisms for U. S. made automobiles is illustrated. As illustrated in FIG. 4, a part of an inner panel of a door 44 includes a latch release handle 46 on the inside of the door. The lock mechanism includes, in some installations, a slide lock 48 is located slightly forward and above the latch release handle 46. In a preferred embodiment, the switch 30 is a toggle switch located preferably just forward of the lock release mechanism 48. With this arrangement, as the driver reaches for the lock or latch of the door, the switch 30 can be activated. The passenger switch 31 may also be similarly mounted on the passenger's door.

Referring to FIG. 5, an alternate embodiment of the apparatus is illustrated wherein the same elements are identified by the same reference numerals. In the FIG. 5 embodiment, a pressurized source of fluid comprises a pump 50 connected to a fluid reservoir 52 for drawing fluid therefrom and conveying it under pressure to the nozzles 12 and 14. The pump 50 is operated by a control circuit comprising a battery 54 connected by conductors 56 and 58, with a switch 60. It is also apparent that a simple mechanical system may also be used, such as by mounting a canister in the door with the nozzle directed through an opening. The canister valve would be positioned to be accessible to the driver.

The disabling fluid used in the present apparatus may be any one of a number of well known ladhrymators and may be either a gas or liquid or both. For example, a gas may be dispensed directly from a pressurized canister. A liquid may be dispensed by means of a pressurized gas or by a pump. A pressurized air or gas helps atomize a liquid and form it into a mist or fog as it is dispensed. A pressurized liquid is broken up into tiny droplets by the nozzle forming a fine mist or fog.

Referring to FIG. 6, a typical nozzle 62 with a protective cover is illustrated. The nozzle body 64 is provided with threads for mounting and with a passage or orifice 66 from which the fluid is dispensed. The nozzle is provided with a protective cover 68, such as a thin elastic plastic film. This prevents the entry of road dirt and grit into the nozzle which may plug it. As soon as the nozzle is pressurized, the cover pops off and enables the apparatus to operate. Other protective means such as a check valve or protective covering of grease or the like may also be used.

In operation, as an operator of a vehicle observes an impending attack, button or switch 30 is activated or closed, activating the system, thereby dispensing a disabling fluid from the pressurized source 18 through the nozzles 12 and 14. These nozzles dispense the fluid in a fog or mist in an upper part of the zone identified as the entry or access zone to the interior of the automobile. The fog or spray will at least temporarily disable the attacker, enabling the automobile operator to leave the area of danger.

While I have illustrated and described my invention by means of specific embodiments, it is to be understood that numerous changes and modifications may be made therein without departing from the spirit and scope of the invention as defined in the appended claims.

I claim:

1. An apparatus for protecting an auto from hijacking, comprising:
   nozzle means including at least one nozzle for mounting in a position adjacent a lower edge of a window of a driver's door for directing a spray of a disabling substance into an area outward and upward from the bottom of the window at the driver's door;
   a pressurized canister containing a disabling fluid;
   conduit means including a valve for connecting said canister of fluid to said nozzle for delivering a selected quantity of said fluid thereto; and
   remote control means for mounting on an inside of a door panel adjacent a door latch release handle and operative from the driver's seat of the auto for activating said valve for initiating the dispensing of a quantity of said fluid via said nozzle.

2. An anti-theft system according to claim 1 wherein said nozzle means comprises a first nozzle for the driver's door and a second nozzle for the front passenger's door.

3. An anti-theft system according to claim 1 wherein said nozzle means comprises a first nozzle for mounting at a forward edge of the driver's door at about window level and directed for spraying an area outward and upward from a bottom of the window and a second nozzle for mounting at a forward edge of the front passenger's door and directed for spraying an area outward and upward from a bottom of the window.

4. An anti-theft system according to claim 3 wherein:
   said valve is an electrically operated valve; and
   said remote control means is an electrical circuit including a switch for mounting adjacent the door latch release handle and operative from the driver's seat for operating said valve for initiating the dispensing of a quantity of said fluid via said nozzle.

5. An anti-theft system according to claim 4 wherein said disabling fluid is taken from the group consisting of tear gas and pepper gas.

6. An anti-theft system according to claim 1 wherein said nozzle has a protective covering.

7. In combination, an automobile having an apparatus for protecting the automobile from hijacking, comprising:
   an automobile body having a driver's compartment and a passenger's compartment, a driver's door with a window and a front passenger's door with a window;

nozzle means including at least one spray nozzle mounted in a position at least adjacent said driver's door for directing a spray of a disabling fluid into and at least covering an area outward and upward from a bottom of said window of said drivers door;

a source of pressurized disabling fluid mounted in said body;

conduit means including valve means for connecting said source of fluid to said nozzle means for delivering a selected quantity of said fluid to said spray nozzle; and remote control means mounted on an inner surface and proximate a latch release handle of said driver's door and operative from said driver's compartment for activating said valve means and initiating the dispensing of a quantity of said fluid via said nozzle.

8. A combination according to claim 7 wherein said nozzle means comprises a first nozzle for the driver's door and a second nozzle for the front passenger's door.

9. A combination according to claim 7 wherein said nozzle means comprises a first nozzle for mounting at a lower edge of the window of the driver's door at about lower edge of the window level and directed for spraying an area outward and upward from a bottom of the window and a second nozzle for mounting at a forward edge of the front passengers's door and directed for spraying an area outward and upward from a bottom of the window.

10. A combination according to claim 9 wherein:
said valve means comprises an electrically operated valve; and
said remote control means is an electrical circuit including a switch mounted on an inner surface and proximate a latch release handle of said driver's door and operative form the driver's seat for operating said valve for initiating the dispensing of a quantity of said fluid via said first nozzle.

11. A combination according to claim 10 wherein said source of pressurized disabling fluid comprises a pressurized canister containing said fluid and a propellant gas mounted within the driver's door.

12. A combination according to claim 11 wherein said disabling fluid is taken from the group consisting of tear gas, pepper gas, and Mace.

13. A combination according to claim 10 wherein said source of pressurized disabling fluid comprises a reservoir containing said fluid and a pump for pressurizing said fluid.

14. The combination of an automobile and an apparatus for protecting the automobile from hijacking, comprising:

an automobile body having a driver's compartment and an adjacent passenger's compartment, a driver's door with a window and a passenger's door with a window;

first nozzle means including a first nozzle mounted in a position adjacent a bottom edge of the window of said driver's door for directing a spray of a disabling fluid into and covering an area outward and upward from the bottom of said window of said driver's door;

second nozzle means including a second nozzle mounted in a position adjacent a bottom edge of the window of said passenger's door for directing a spray of a disabling fluid into and covering an area outward and upward from a bottom of said window of said passenger's door;

a source of pressurized disabling fluid mounted in said body;

conduit means including valve means for connecting said source of fluid to said first nozzle and said second nozzle for delivering a selected quantity of said fluid to said nozzles; and remote control means mounted on an inside portion of said driver's door closely adjacent a door release handle and operative at least from said driver's compartment for activating said valve means and initiating the dispensing of a quantity of said fluid via at least said first nozzle.

15. A combination according to claim 14 wherein said remote control means includes means operative from said passenger's compartment for activating said valve means.

16. A combination according to claim 15 wherein:
said valve means comprises an electrically operated vale; and
said remote control means is an electrical circuit including a first switch mounted on an inside portion of said driver's door closely adjacent a door release handle and operative from the driver's seat, and a second switch operative from the passenger's compartment for operating said valve for initiating the dispensing of a quantity of said fluid via said first nozzle and said second nozzle.

* * * * *